United States Patent [19]

Ashcraft et al.

[11] 4,263,158
[45] Apr. 21, 1981

[54] DIELECTRIC COMPOSITIONS STABILIZED AGAINST WATER TREEING WITH ORGANO SILANE COMPOUNDS CONTAINING THE AZOMETHINE GROUP AND PARTIAL CONDENSATION PRODUCTS

[75] Inventors: Arnold C. Ashcraft, Hightstown; Robert J. Turbett, Millington, both of N.J.

[73] Assignee: Union Carbide Corporation, New York, N.Y.

[21] Appl. No.: 76,627

[22] Filed: Sep. 18, 1979

Related U.S. Application Data

[63] Continuation-in-part of Ser. No. 60,768, Jul. 26, 1979, abandoned, which is a continuation-in-part of Ser. No. 971,817, Dec. 21, 1978, abandoned, which is a continuation of Ser. No. 864,752, Dec. 27, 1977, abandoned.

[51] Int. Cl.³ .................................................. H01B 3/30
[52] U.S. Cl. ............................ 252/573; 174/110 PM; 174/110 S; 252/574; 260/45.9 R; 427/117
[58] Field of Search .......................... 252/63.7, 63.2; 174/110 PM, 110 S, 110 SR, 110 R; 427/117; 260/45.9 R

[56] References Cited

U.S. PATENT DOCUMENTS

| | | | |
|---|---|---|---|
| 2,942,019 | 6/1960 | Pike et al. | 260/448.2 N |
| 3,649,542 | 3/1972 | Hasebe et al. | 252/63.7 X |
| 3,674,695 | 7/1972 | Wuerstlin et al. | 252/63.2 |
| 3,943,271 | 3/1976 | Bahder et al. | 174/110 PM X |
| 3,956,420 | 5/1976 | Kato et al. | 525/100 |
| 4,035,311 | 7/1977 | Feichtmayr et al. | 252/63.2 |
| 4,042,776 | 8/1977 | Matsuba et al. | 174/110 PM X |

FOREIGN PATENT DOCUMENTS 2737430 2/1979 Fed. Rep. of Germany ......... 252/63.7

Primary Examiner—Harris A. Pitlick
Attorney, Agent, or Firm—James C. Arvantes

[57] ABSTRACT

A dielectric composition comprising ethylene polymer and effective amounts, as a water treeing inhibitor, of at least one organo silane of the following formula:

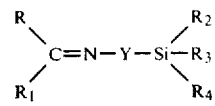

wherein R and $R_1$ are independently selected from hydrogen, a hydrocarbyl group or substituted hydrocarbyl groups wherein the substituents are hydroxy, halogen, nitro, $C_1$ to $C_8$ alkyl, $C_1$ to $C_8$ alkoxy; or R and $R_1$ together with the adjacent carbon atom form a ring of 3 to 7 carbon atoms; $R_2$ is $C_1$ to $C_8$ alkyl, $C_1$ to $C_{18}$ alkoxy, $C_6$ to $C_{18}$ aryl, $C_1$ to $C_8$ acyloxy, $C_6$ to $C_{18}$ substituted or unsubstituted aryloxy; $R_3$ and $R_4$ are independently selected from $C_1$ to $C_{18}$ alkoxy, $C_6$ to $C_{18}$ substituted or unsubstituted aryloxy or $C_1$ to $C_8$ acyloxy; Y is $C_1$ to $C_8$ alkylene, $C_6$ to $C_{18}$ substituted or unsubstituted arylene or $-CH_2CH_2NH(CH_2)_3-$.

Partial condensation products of the silanes also have been found to inhibit water treeing in ethylene polymers.

10 Claims, 4 Drawing Figures

METHOD OF MEASUREMENT OF WATER TREE LENGTH

METHOD OF MEASUREMENT OF WATER TREE LENGTH

FIELD DEPENDENCE OF WATER TREE GROWTH RATE $$\frac{dL}{dt} = 2.47 \times 10^{-11} E^2$$

DIELECTRIC COMPOSITIONS STABILIZED AGAINST WATER TREEING WITH ORGANO SILANE COMPOUNDS CONTAINING THE AZOMETHINE GROUP AND PARTIAL CONDENSATION PRODUCTS

This application is a continuation-in-part of our prior U.S. Application Ser. No. 060,768, filing date July 26, 1979, now abandoned, which is a continuation-in-part of U.S. Application Ser. No. 971,817, filing date Dec. 21, 1978, now abandoned, which is a continuation of U.S. Application Ser. No. 864,752, filed Dec. 27, 1977, now abandoned.

BACKGROUND OF THE INVENTION

1. Field of the Invention

This invention relates to inhibiting electrical breakdown by water treeing in dielectric materials which are based on ehtylene polymers.

2. Description of the Prior Art

Compositions based on polyolefins are well known and they are used extensively as insulation materials for wire and cable. As insulation materials, properties of the compositions such as intrinsic electrical strength, corona resistance and resistance to treeing are important.

Intrinsic electrical breakdown is the catastrophic failure of a dielectric accompanied by arcing or discharge through an ionized channel in the dielectric. The intrinsic dielectric strength is considered to be an inherent property of the dielectric material.

In power cable applications for transmitting relatively high voltage loads such as 5 KV and above, corona may be a problem because it may lead to the premature breakdown of the cable insulation. Corona is an electrical plasma resulting from the ionization of a gaseous dielectric in regions of high electrical field. Corona resistance is the ability of a dielectric to withstand the corrosive action of an electrical plasma in contact with it.

When used as a high voltage power cable insulation, olefin base compositions undergo a prebreakdown phenomenon known as treeing. This type of damage progresses through a dielectric section under electrical stress so that, if visible, its path looks something like a tree. Treeing can occur and progress slowly by periodic partial discharge. It may occur slowly in the presence of moisture without any partial discharge, or it may occur rapidly as the result of an impulse voltage. Trees may form at sites of high electrical stress such as contaminants or voids in the body of the insulation or at irregularities at the insulation-semiconductive screen interface.

In solid organic dielectrics, treeing is the most likely mechanism of electrical failures which do not occur catastrophically, but rather appear to be the result of a more lengthy process. It is desired to extend the service life of olefin-insulated cables by modification of the insulating materials so that trees are initiated at higher voltages than usual or so that the rate of growth of trees is reduced once initiated.

Electrical treeing results from internal electrical discharges which decompose the dielectric. Although high voltage impulses can produce electrical trees, and the presence of internal voids and contaminants is undesirable, the damage which results from application of moderate a.c. voltages to electrode/insulation interfaces which contain imperfections is more commercially significant. In this case, very high localized stress gradients can exist and with sufficient time lead to initiation and growth of trees which may be followed by breakdown. An example of this is a high voltage power cable or connector with a rough interface between the conductor or conductor shield and the primary insulator. The failure mechanism involves actual breakdown of the molecular structure of the dielectric material perhaps by electron bombardment. Much of the prior art is concerned with the inhibition of electrical trees.

Water treeing is a deterioration of a solid dielectric material which is simultaneously exposed to moisture and an electric field. It is a significant factor in determining the useful life of buried high voltage power cables. Water trees initiate from sites of high electrical stress such as rough interfaces, protruding conductive points, voids, or imbedded contaminants but at a lower field than that required for electrical trees. In contrast to electrical trees, water trees are characterized by:

(a) the presence of water is essential for their growth;
(b) no partial discharge is normally detected during their growth;
(c) they can grow for years reaching a size where they may contribute to a breakdown;
(d) although slow growing, they are initiated and grow in much lower electrical fields than those required for the development of electrical trees.

Thus, intrinsic electric breakdown, failure by corona, electrical treeing and water treeing are different and the mechanisms for each are different. It follows that a different solution is required to effect improvement in a dielectric material for each mode of failure involved.

Additionally, it is known that when crosslinked olefin polymers, particularly polyethylene, are used for power cable insulation, a crosslinking agent may function as a water treeing inhibitor. When dicumyl peroxide is used as the crosslinking agent in polyethylene, for example, the peroxide residue functions as a tree inhibitor for some time after curing. However, these residues are eventually lost at the temperatures of cable service. Therefore, in order to be an effective water treeing inhibitor an additive must be such that it is retained in the olefin composition at the temperature of cable service.

SUMMARY OF THE INVENTION

It has now been found that dielectric compositions based on ethylene polymers and used as insulation materials in high voltage wire and cable are protected from water treeing under long term use under high voltage conditions, if the composition contains as a water treeing inhibitor, one or more organo silanes.

The organo silanes of the present invention have excellent compatibility with ethylene polymers, high retention under cable service temperatures, and resistance to water tree growth.

An object of the present invention is to provide a process for employing dielectric materials as insulation in high voltage wire and cable while protecting such dielectric material against water treeing.

Another object of the present invention is to provide dielectric materials which are resistant to water treeing in high voltage wire and cable and which retain this resistance under the conditions of use of the wire and cable.

A further object of the present invention is to provide a high voltage wire and cable which is resistant to water treeing.

These and other objects are achieved by employing certain organo silane compounds as water treeing inhibitors in combination with ethylene polymers in the dielectric insulation compositions of the present invention.

DESCRIPTION OF THE PREFERRED EMBODIMENTS

The Dielectric Composition

Figure 1:
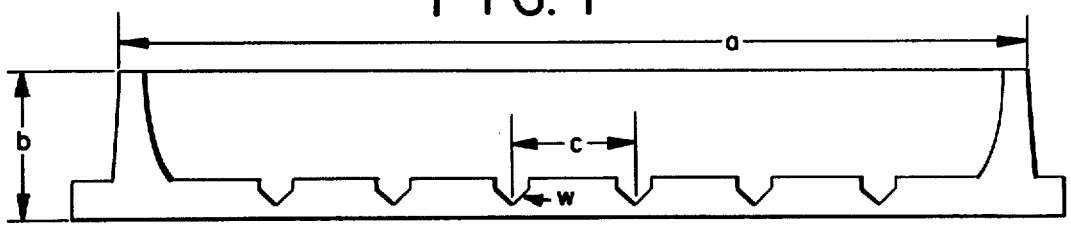
FIGS. 1 and 1A show a specimen for evaluating water tree stabilization.

The dielectric composition of the present invention comprises, in weight ratio, 100 parts by weight of ethylene polymer, as described below, and about 0.1 to 10, and preferably, about 0.5 to 3.0, parts by weight of at least one of the organo silane compounds which are also described below.

Ethylene Polymer

The ethylene polymers which are used in the compositions of the present invention are solid (at 25° C.) materials which may be homopolymers, or copolymers of ethylene. The ethylene copolymers contain at least 30 weight percent of ethylene and up to about 70 weight percent of propylene, and/or up to about 50 weight percent of one or more other organic compounds which are interpolymerizable with ethylene. These other compounds which are interpolymerizable with ethylene are preferably those which contain polymerizable unsaturation, such as is present in compounds containing an ethylene linkage, >C=C<. These other interpolymerizable compounds may be hydrocarbon compounds such as, butene-1, pentene-1, isoprene, butadiene, bicycloheptene, bicycloheptadiene and styrene, as well as vinyl compounds such as vinyl acetate and ethyl acrylate.

These copolymers could thus include those containing >0 to 70 weight of propylene and 30 to <100 weight percent of ethylene; and >0 to <50 weight percent butene-1 or vinyl acetate and 50 to <100 weight percent of ethylene; and >0 to <30 weight percent of propylene, >0 to 20 weight percent of butene-1 and 50 to <100 weight of ethylene.

Preferred copolymers are ethylene/ethyl acrylate, ethylene/propylene, ethylene/butene and the like.

Also included in the term polymer are blends of one polymer with one or more other polymers. Illustrative of such blends are polyethylene with polypropylene, low-density polyethylene with high-density polyethylene, and polyethylene with olefin copolymers such as those indicated above.

The low density ethylene copolymers with α-olefins may be made under low pressure conditions of about 150 to 300 psi with supported chromium oxide based catalysts that are modified with titanium and optionally, fluorine, as disclosed in U.S. Pat. Nos. 3,606,736 and 4,011,382. The disclosure of these patents are incorporated herein by reference.

The ethylene polymers described herein have a density (ASTM 1505 test procedure with conditioning as in ASTM D-1248-72) of about 0.86 to 0.96 grams/cubic centimeter and a Melt Index (ASTM D-1238 at 44 psi test pressure) of about 0.1 to 10 decigrams per minute.

Organo Silane

The organo silane which is employed in the dielectric compositions of the present invention is selected from one or more compounds of the following formula:

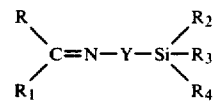

wherein R and $R_1$ are independently selected from hydrogen, or a hydrocarbyl group such as $C_1$ to $C_8$ alkyl, $C_6$ to $C_{18}$ substituted or unsubstituted aryl, and substituted hydrocarbyl groups with substituents such as hydroxy, halogen, nitro, $C_1$ to $C_8$ alkyl, $C_1$ to $C_8$ alkoxy; or R and $R_1$ together with the adjacent carbon atom form a ring of 3 to 7 carbon atoms, $R_2$ is $C_1$ to $C_8$ alkyl, $C_1$ to $C_{18}$ alkoxy, $C_6$ to $C_{18}$ aryl, $C_1$ to $C_8$ acyloxy, $C_6$ to $C_{18}$ substituted or unsubstituted aryloxy; $R_3$ and $R_4$ are independently selected from $C_1$ to $C_{18}$ alkoxy, $C_6$ to $C_{18}$ substituted or unsubstituted aryloxy, or $C_1$ to $C_8$ acyloxy; Y is $C_1$ to $C_8$ alkylene, $C_6$ to $C_{18}$ substituted or unsubstituted arylene or —$CH_2CH_2NH(CH_2)_3$—.

Partially condensed products of these organo silanes also inhibit water treeing when mixed with ethylene polymers. The condensation products are formed upon the partial hydrolysis and subsequent condensation that splits out alcohol as a by product.

For example, if $R_3$ is ethoxy, partial condensation would occur according to the following reaction:

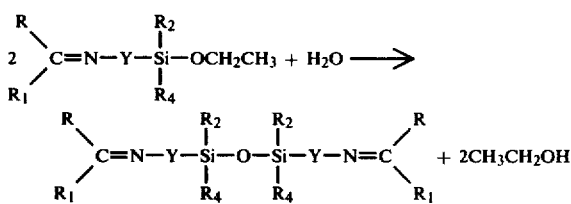

The condensed species contain the group

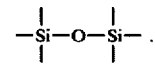

The condensation step can be repeated several times to form a longer chain.

These organo silanes are prepared by reacting either an aldehyde or a ketone with an aminoalkylsilane as set forth in, for example, U.S. Pat. No. 2,942,019, which is incorporated herein by reference.

The preferred organo silanes are derived by reacting N-β(aminoethyl)-γ-aminopropyltrimethoxy silane or γ-aminopropyltriethoxysilane with benzaldehyde. A preferred composition contains about 0.8 weight percent of the partially condensed silane described in Example 21.

Adjuvants

In addition to the ethylene polymer and the organo silane, the dielectric compositions of the present invention may also include crosslinking agents where the dielectric composition is to be used as a vulcanized composition rather than as a thermoplastic composition, and it is to be chemically crosslinked. These chemical vulcanizing, curing or crosslinking agents are well known to those in the art and include the organic peroxide type of crosslinking agents which are disclosed for example, in U.S. Pat. Nos. 2,826,570, 2,888,424, 2,916,481, 3,079,370 and 3,296,189, the disclosures of such patents being incorporated herein by reference. The chemical crosslinking agents may be used individually or in combination with one another, and they are used in crosslinking effective amounts. The preferred crosslinking agent is di-α-cumyl peroxide.

The dielectric compositions of the present invention also advantageously include one or more suitable high temperature antioxidants for the ethylene polymer in such compositions. The antioxidants include sterically hindered phenols or amines. Polymerized 2,2,4-trimethyl dihydroquinoline may also be used. These are used in conventional amounts to obtain the intended effect in the composition.

Other adjuvants which may be employed in the compositions of the present invention would include adjuvants commonly employed in ethylene polymer based dielectric compositions including lubricants, oil extenders, dyes and colorants, and metal deactivators.

These adjuvants would be used in amounts designed to provide the intended effect in the resulting composition.

A preferred composition contains about 0.12 weight percent thiodiethylene bis-(3,5-di-tert.-butyl-4-hydroxy) hydrocinnamate as an antioxdant.

The dielectric compositions of the present invention may also be extended, or filled, with polymers other than the ethylene polymer which are compatible, i.e., can be physically blended or alloyed, or grafted with the ethylene polymer. The resulting compositions should contain at least about 30 weight percent of interpolymerized ethylene in all the polymers that may be present in the composition, based on the total weight of the resulting composition. The other polymers which may be used would include polyvinyl chloride and polypropylene, ethylene propylene rubbers (EPR), ethylene, propylene, diene polymers (EPDM), styrene-butadiene-styrene block copolymers, urethane elastomers, polyester elastomers and natural rubber.

The total amount of adjuvants used will range from 0 to about 60 weight percent, preferably 0 to 10 weight percent based on the total weight of the dielectric composition.

Processing of the Dielectric Compositions

All of the components of the dielectric compositions of the present invention are usually blended or compounded together, preferably at about 160° C. for thermoplastic material, prior to their introduction into the extrusion device from which they are to be extruded onto an electrical conductor. The ethylene polymer and the other desired constituents may be blended together by any of the techniques used in the art to blend and compound thermoplastics to homogeneous masses. For instance, the components may be fluxed on a variety of apparatus including multi-roll mills, screw mills, continuous mixers, compounding extruders and Banbury mixers. The organo silanes may be prepared in advance or in situ during the compounding step by adding appropriate quantities of aldehyde or ketone and aminosilane. A separate preparation step may be used for less reactive ketones, and a catalyst such as ammonium chloride can be used.

After the various components of the compositions of the present invention are uniformly admixed and blended together, they are further processed, in conventional extrusion apparatus at about 120° C. to 160° C. for cross-linkable compositions, and at about 200° C. for thermoplastic compositions.

After being extruded onto a wire or cable, or other substrate, the cross-linkable compositions of the present invention are vulcanized at elevated temperatures of about 180° C. and preferably at 215°-230° C. using conventional vulcanizing procedures.

Figure 1A:
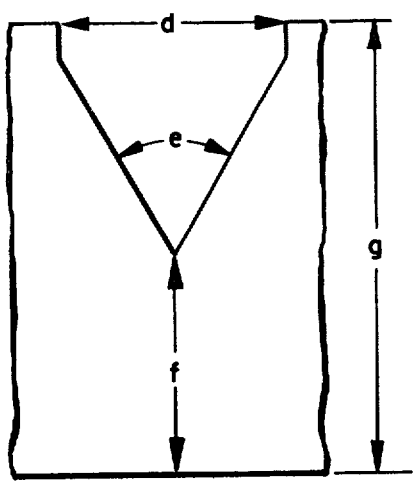

Evaluation of Organo Silane Water Treeing Inhibitors in Dielectric Compositions In order to determine the utility and effectiveness of the water treeing stabilized dielectric compositions of the present invention, the compositions were evaluated with the organo silanes incorporated therein by use of an accelerated water tree test which incorporates a combination of frequency acceleration and a standard-defect specimen. The test utilizes a compression molded dish-shaped specimen having 24 conical depressions molded into the bottom. FIG. 1 shows a cross sectional view of the specimen, where a is 152.4 millimeters, b is 25.4 millimeters and c is 19.05 millimeters. The conical depression, W, of FIG. 1 is magnified in FIG. 1A where d is 3.18 millimeters, e is 60 degrees, f is 3.18 millimeters, g is 6.35 millimeters and the tip radius is about 5 μm. The calculated maximum field is about 250 kv/mm in a typical 15 kv power cable.

When testing these specimens, 100 ml. of an electrolyte solution is poured into the dish which is then placed into a grounded bath, usually containing the same electrolyte solution. A 50 millimeter diameter platinum wire ring is then immersed in the electrolyte in the dish and connected to the voltage source.

Preliminary experiments at 8.5 kHz showed that electrical treeing followed by breakdown rapidly occurred at test voltages of 10 kv or above. In order to limit the study to the effects of water treeing, the voltage used in the examples was 5 kv. Under these conditions a low density polyethylene specimen will develop water trees at the tips of the conical depressions between 120 and 240 micrometers in length in 24 hours using 0.01 N NaCl in distilled water as the electrolyte solution.

To facilitate study of the water trees found, each of the twelve conical depressions nearest the center of the specimen is punched out using a 12.7 millimeter (½ inch) circular die and an arbor press. The resulting discs are placed in a boiling solution of 0.50 g. methylene blue and 8 milliliter concentrated aqueous ammonia (28% approx.) in 250 milliliters distilled water for 30 minutes. The discs are then sectioned and mounted on microscope slides for examination. Specimens prepared in this way have been kept for periods up to two years without apparent deterioration of the appearance of water trees.

Figure 2:
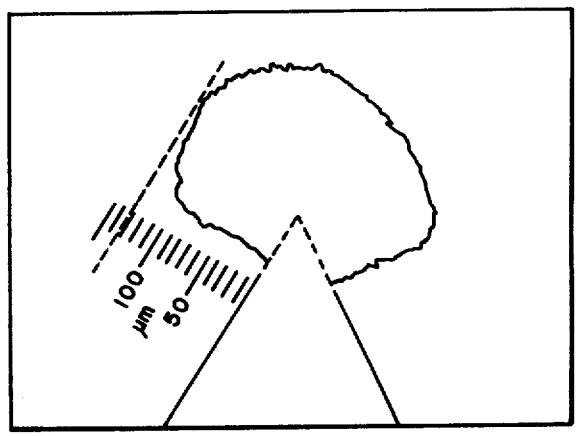
FIG. 2 shows a typical water tree.

A typical water tree grown for 24 hours in low density polyethylene under the above conditions and stained as described, is depicted in FIG. 2. The growth occurs in an approximately hemispherical region centered on the tip of the cone, which is usually heavily obscured. Because of this, the most satisfactory direction for measuring the extent of tree growth was found to be perpendicular to the side of the cone as indicated in FIG. 2. In our procedure all twelve of the stained trees from the central group of conical depressions are measured and the average length calculated.

The rate of growth of water trees, dL,/dt varies from their initiation, when the growth rate is quite fast, to a much slower rate after they have grown large. The data fit the empirical equation shown below:

$$(dL)/(dt) = 0.0240 t^{-0.606} \quad (1)$$

or equivalently:

$$(dL)/(dt) = 0.000323 \, L^{-1.54} \quad (2)$$

where L is the length of the growing tree and t is the time at which the measurement is taken, in hours.

Figure 3:
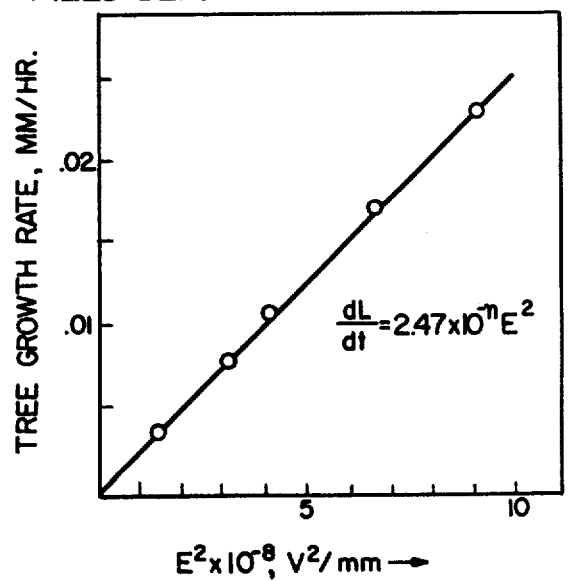
FIG. 3 is a graph showing the field dependence of water tree growth rate.

If one assumes that water trees are relatively conductive compared to polyethylene, one can calculate the electrical field, E, at the boundry of a growing tree from equation 3 which was derived for the point-to-point geometry of the present test method.

$$E = \frac{V\sqrt{1 + r/d}}{r \tanh^{-1} \sqrt{1/(1 + r/d)}} \quad (3)$$

where V is the voltage applied to the electrolyte in the specimen dish, r the point electrode radius, is identified with L, the length of the growing tree, and d is 3.175 mm-L, the distance to the ground electrode. A graph of experimentally measured tree growth rates, dL/dt, plotted as a function of $E^2$, calculated by equation 3, is given in FIG. 3. The straight line passing through the data points is the graph of the equation:

$$(dL)/(dt) = k \, E^2 \quad (4)$$

where k is the rate constant for water treeing, and has the value of $2.47 \times 10^{-11}$ (mm/hr) / ($V^2/mm^2$) for this experiment. Since E is known as a function for L from equation 3, one can numerically integrate the following equation 5:

$$(dL)/(E^2) = k \, dt \quad (5)$$

to provide a value for the rate constant for treeing from an individual measurement of tree length.

$$\int_0^L \frac{dL}{E^2} = \frac{1}{V^2} \int_0^L \frac{r^2 (\tanh^{-1} \sqrt{1/(1 + r/d)})^2 \, dL}{1 + r/d} = \quad (6)$$

$$\frac{I}{V^2} = k \int_0^t dt = k \Delta t$$

$$k = \frac{I}{V^2 \Delta t} \quad (7)$$

wherein dL E, V, r, d and t are as previously defined.

The following examples are merely illustrative of the scope of the present invention and are not intended as a limitation upon the scope therof.

General Admixing Procedure

The dielectric compositions used in the Examples below were all prepared according to the foollowing Procedure A:

Procedure A

Polyethylene homopolymer of 0.2 dg/min Melt Index and 0.92 g/cc density, or ethylene-α-olefin copolymer of 0.8 dg/min Melt Index and density of 0.92 g/cc, organo silane and antioxidant are charged to a Banbury mixer and compounded to a melt temperature of approximately 140° C. The resulting composition was then sheeted on a 2-roll mill, granulated and compression molded into test specimens, as heretofore described, at approximately 165° C.

Water Tree Growth Rate (hereinafter WTGR) is the ratio of rate for the test composition to that of a control. The controls are a commercial grade of high molecular weight polyethylene having a Melt Index of 0.2 dg/minute and a density of 0.918 grams/cubic centimeter and containing 0.10 percent of 4,4'-thiobis (3-methyl-6-tert-butyl phenol) anti-oxidant (Control A); or an ethylene-butene-1 copolymer having a Melt Index of 0.8 dg/minute and a density of 0.92 grams/cubic centimeter and containing 0.10 percent of thiodiethylene-bis (3,5-ditert-butyl-4-hydroxy) hydrocinnamate anti-oxidant (Control B). The ingredients of these Controls were mixed according to Procedure A, but without organo silane additive. The water tree growth rate was obtained by measuring the length of water trees formed in 24 hours and calculating the absolute rate of tree growth, as heretofore described by equations (1) to (7). Relative values of 1.0 and 1.03 for water tree growth rate were assigned to Control A and Control B, respectively.

EXAMPLE 1

This Example illustrates the formation of the organo silane in situ by adding an aldehyde and amino silane to the polethylene in the compounding step.

The following were charged to a Banbury mixer: 28 pounds of the polyethylene of Control A, 122.4 grams of benzaldehyde and 256 grams of N-β(aminoethyl)-γ-amino-propyltrimethoxysilane.

Mixing was conducted until the melt temperature reached 325° F., after which the charge was dropped to a conventional extruder, stranded and diced. A water tree test specimen was molded at 165° C. as heretofore described. Water tree growth was obtained by measuring the length of water trees formed in 24 hours. Relative rates of tree growth were calculated as heretofore described by equations (1) to (7). The data are summarized in Table I.

EXAMPLE 2

Example 1 was exactly repeated except that after compounding, the composition was placed in a vacuum oven at 75° C. for 48 hours. The WTGR is listed in Table 1.

EXAMPLES 3 to 5

Compositions were prepared according to Procedure A by compounding in a laboratory Brabender mixer: The polyethylene homopolymer and antioxidant of Control A and organo silane. The organo silane additives were formed in situ as in Example 1. Relative rates of water tree growth were calculated as heretofore described in equations (1) to (7). The reactants used to produce the organo silane, as well as the concentrations and the WTGR are as set forth in Table 1.

EXAMPLE 6

This Example illustrates the formation of the organo silane by prereacting a ketone with an aminosilane and adding this reaction product to the polymer.

The organo silane was prepared by reacting acetophenone and γ-aminopropyltriethoxy silane in the presence of ammonium chloride catalyst.

1.5 weight percent of the organo silane so prepared was added to the polyethylene of Control A in a laboratory Banbury mixer according to Procedure A. The WTGR after placing the composition in a vacuum oven at 75° C. for 48 hours was 0.21.

This Example shows that heating under a vacuum does not reduce water treeing resistance as shown by the low value for WTGR.

TABLE I

| Example | Organo Silane Aldehyde or Ketone (wt.%) | Amino-silane(wt.%) | WTGR |
|---|---|---|---|
| 1 | Benzaldehyde (1.0) | A (2.09) | 0.05 |
| 2 | Benzaldehyde (1.0) | A (2.09) | 0.05 (Vacuum) |
| 3 | 2-hydroxy-4-n-octoxy Benzophenone (1.0) | B (0.6) | 0.14 |
| 4 | 2,2'-dihydroxy-4,4' dimethoxy benzophenone (1.0) | B (0.95) | 0.07 |
| 5 | Benzaldehyde (0.5) | B (1.0) | 0.15 |

A is N-(aminoethyl)-γ-aminopropyltrimethoxy silane
B is γ-aminopropyltriethoxysilane The data in Table 1 shows that water tree growth rate was lower in all cases than that of Control A. In those Examples (2 and 6) where vacuum treatment was applied to the sample, the resistance to water treeing was retained, as shown by the low value for WTGR.

Examples 7 to 16

Compositions were prepared according to Procedure A by compounding in a laboratory Brabender mixer or Banbury mixer: The polyethylene copolymer and antioxidant of Control B and organo silane.

The organo silane additives were formed in situ as in Example 1. Relative rates of water tree growth were calculated as heretofore described in equations (1) to (7). The reactants used to produce the organo silane, as well as the concentration and the WTGR are as set forth in Table II.

TABLE II

| Example | Organo Silane Aldehyde or Ketone (wt.%) | Amino-silane(wt.%) | WTGR |
|---|---|---|---|
| 7 | Acetophenone (1.0) | A (2.0) | 0.04[1] |
| 8 | 2-hydroxy-4-n-Octoxy-Benzophenone (0.5) | A (1.0) | 0.27 |
| 9 | Benzaldehyde (1.0) | B (2.08) | 0.05 |
| 10 | Benzaldehyde (1.0) | B (2.08) | 0.03[1] |
| 11 | 1-Napthaldehyde (0.5) | B (0.71) | 0.10 |
| 12 | 9-Anthraldehyde (0.5) | B (0.54) | 0.08 |
| 13 | 1-Pyrenecarboxaldehyde (0.5) | B (0.48) | 0.09 |
| 14 | 2-Hydroxy-1-Naphthaldehyde (0.5) | B (0.64) | 0.04 |
| 15 | p-Nitro Benzaldehyde (0.5) | B (0.73) | 0.14 |
| 16 | p-Anisaldehyde (1.0) | B (1.63) | 0.06 |

[1] Samples were placed in a vacuum oven at 75° C. for 48 hours after make up
A is N-β(aminoethyl)-γ-aminopropyltrimethoxy silane
B is γ-aminopropyltriethoxy silane

EXAMPLES 17 to 20

Example 6 was exactly repeated except that the reactants used to prepare the organo silane, amount of such a prepared organo silane which was added to the polyethylene copolymer and WTGR are as set forth in Table III.

TABLE III

| Example | Organo Silane Aldehyde or Ketone | Amino Silane | Amt. of Organo Silane (wt.%) | WTGR |
|---|---|---|---|---|
| 17 | Acetophenone | B | 1.0 | 0.06[1] |
| 18 | Methyl ethyl ketone | B | 1.0 | 0.34 |
| 19 | Methyl ethyl ketone | B | 2.0 | 0.14 |
| 20 | Methyl ethyl ketone | B | 2.0 | 0.03[1] |

[1] Samples were placed in a vacuum oven at 75° C. for 48 hours after make up.
B is γ-aminopropyltriethoxy silane.

The data in Tables II and III show that the WTGR was appreciably lower in these Examples, as compared with that of Control B in which the value of WTGR is high. Also, this inhibition is retained by the composition, as seen by the low values of WTGR for the compositions of Examples 7, 10, 17 and 20, which were treated in a vacuum oven after make up.

EXAMPLE 21

This example shows water treeing inhibitor properties of the partially condensed organo silane.

The organo silane was prepared by prereacting equimolar quantities of benzaldehyde and γ-amino propyl-triethoxy silane and allowing the by-product water to react with the silyl ester groups to give about 50% condensed species.

A composition was prepared according to Procedure A in a laboratory Brabender mixer using the ethylene homopolymer and antioxidants of Procedure A and 1% by weight of the partially condensed organo silane. The WTGR for this composition was 0.04 initially, and 0.06 after vacuum treatment for 14 days at 85° C.

EXAMPLE 22

This example shows water treeing inhibition properties of organo silane having higher formula weight alkoxy groups.

The organo silane was prepared by prereacting benzaldehyde and γ-amino propyl-triethoxy silane in equimolar quantities, as in Example 21, but the by-product water was removed. The resulting azomethine silane was then reacted with dodecyl alcohol so that half of the ethoxy groups were replaced with dodecyloxy groups.

A composition prepared as in Example 21, again using 1% by weight of organo silane, had a WTGR of 0.09 before vacuum treatment and 0.04 after vacuum treatment.

What is claimed is:

1. A dielectric composition comprising ethylene polymer and effective amounts, as a water treeing inhibitor, of at least one organo silane of the following formula:

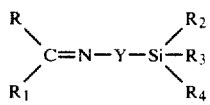

wherein R and R₁ are independently selected from hydrogen, a hydrocarbyl group or substituted hydrocarbyl groups wherein the substituents are hydroxy, halogen, nitro, $C_1$ to $C_8$ alkyl, $C_1$ to $C_8$ alkoxy; or R and $R_1$ together with the adjacent carbon atom form a ring of 3 to 7 carbon atoms; $R_2$ is $C_1$ to $C_8$ alkyl, $C_1$ to $C_{18}$ alkoxy, $C_6$ to $C_{18}$ aryl, $C_1$ to $C_8$ acyloxy, $C_6$ to $C_{18}$ substituted or unsubstituted aryloxy; $R_3$ and $R_4$ are independently selected from $C_1$ to $C_{18}$ alkoxy, $C_6$ to $C_{18}$ substituted or unsubstituted aryloxy or $C_1$ to $C_8$ acyloxy; Y is $C_1$ to $C_8$ alkylene, $C_6$ to $C_{18}$ substituted or unsubstituted arylene or $-CH_2CH_2NH(CH_2)_3-$ 2. A dielectric composition comprising ethylene polymer and effective amounts, as a water treeing inhibitor, of partially condensed organo silane formed from at least one organo silane of the following formual:

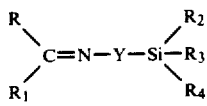

where R and $R_1$ are independently selected from hydrogen, a hydrocarbyl group or substituted hydrocarbyl groups wherein the substituents are hydroxy, halogen, nitro, $C_1$ to $C_8$ alkyl, $C_1$ to $C_8$ alkoxy; or R and $R_1$ together with the adjacent carbon atom form a ring of 3 to 7 carbon atoms; $R_2$ is $C_1$ to $C_8$ alkyl, $C_1$ to $C_{18}$ alkoxy, $C_6$ to $C_{18}$ aryl, $C_1$ to $C_8$ acyloxy, $C_6$ to $C_{18}$ substituted or unsubstituted aryloxy; $R_3$ and $R_4$ are independently selected from $C_1$ to $C_{18}$ alkoxy, $C_6$ to $C_{18}$ substituted or unsubstituted aryloxy or $C_1$ to $C_8$ acyloxy; Y is $C_1$ to $C_8$ alkylene, $C_6$ to $C_{18}$ substituted or unsubstituted arylene or $-CH_2CH_2NH(CH_2)_3-$, wherein the partial condensation has taken place by forming the group

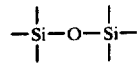

within the partial condensed organo silane.

3. A dielectric composition as in claims 1 or 2, wherein said ethylene polymer is a copolymer.

4. A dielectric composition as in claim 3, in which said copolymer comprises ethylene-ethyl acrylate copolymer.

5. A dielectric composition as in claim 3, in which said copolymer comprises an ethylene -α-olefin copolymer.

6. A dielectric composition as in claim 5, in which said ethylene -α-olefin copolymer is ethylene -α-butene copolymer.

7. A dielectric composition as in claim 2 wherein the partially condensed organo silane is derived by reacting benzaldehyde and γ-amino propyl-triethoxy silane.

8. A dielectric composition as in claim 1 wherein the organo silane is derived by reacting γ-amino propyltriethoxy silane with benzaldehyde.

9. Electric wire or cable insulated with the dielectric composition of claims 1, 2, 7 or 8.

10. The composition of claim 7 containing about 0.8 weight percent of partially condensed organo silane and about 0.12 weight percent of thiodiethylene bis-(3,5-di-tert.-butyl-4-hydroxyl)hydrocinnamate.

11. A dielectric composition as in claims 1 or 2 wherein the said ethylene polymer is polyethylene.

* * * * *